(12) United States Patent
Hockaday et al.

(10) Patent No.: US 8,839,662 B2
(45) Date of Patent: Sep. 23, 2014

(54) STATION PROBE FOR GAS TURBINE ENGINES

(75) Inventors: Bruce Hockaday, Vernon, CT (US);
Thomas M. Ritter, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 288 days.

(21) Appl. No.: 13/169,592

(22) Filed: Jun. 27, 2011

(65) Prior Publication Data

US 2012/0324988 A1    Dec. 27, 2012

(51) Int. Cl.

| G01M 15/14 | (2006.01) |
|---|---|
| G01K 1/02 | (2006.01) |
| G01L 15/00 | (2006.01) |
| G01L 19/00 | (2006.01) |
| G01K 13/02 | (2006.01) |

(52) U.S. Cl.
CPC .......... *G01L 15/00* (2013.01); *G01K 2013/024* (2013.01); *G01K 1/026* (2013.01); *G01L 19/0092* (2013.01); *G01K 13/02* (2013.01)
USPC ..................................... 73/112.01

(58) Field of Classification Search
USPC .......................................... 73/112.01, 112.03
See application file for complete search history.

(56) References Cited

U.S. PATENT DOCUMENTS

| 4,244,221 | A | 1/1981 | Scott |
|---|---|---|---|
| 4,580,910 | A | 4/1986 | Corwin |
| 4,736,155 | A | 4/1988 | McBrien |
| 4,747,700 | A * | 5/1988 | Lenz et al. ..................... 374/135 |
| 5,106,203 | A | 4/1992 | Napoli et al. |
| 5,185,996 | A | 2/1993 | Smith et al. |
| 6,565,255 | B2 | 5/2003 | Sanderson |
| 6,595,062 | B1 * | 7/2003 | Luke et al. ....................... 73/714 |
| 6,642,720 | B2 * | 11/2003 | Maylotte et al. .............. 324/464 |
| 7,056,013 | B2 | 6/2006 | Anderson et al. |
| 7,328,623 | B2 | 2/2008 | Slagle et al. |
| 7,523,615 | B2 | 4/2009 | Singh et al. |
| 7,582,359 | B2 | 9/2009 | Sabol et al. |
| 7,743,600 | B2 | 6/2010 | Babu et al. |
| 7,819,578 | B2 | 10/2010 | Coney et al. |
| 2002/0122459 | A1 * | 9/2002 | McFarland et al. ........... 374/179 |
| 2003/0053293 | A1 | 3/2003 | Beitelmal et al. |
| 2010/0117859 | A1 | 5/2010 | Mitchell et al. |
| 2010/0158074 | A1 | 6/2010 | Fortier et al. |
| 2010/0226756 | A1 | 9/2010 | Mitchell et al. |
| 2012/0167695 | A1 * | 7/2012 | Snider ............................. 73/778 |
| 2012/0216608 | A1 * | 8/2012 | Schleif et al. .............. 73/112.01 |

FOREIGN PATENT DOCUMENTS

WO    2011070535 A1    6/2011

OTHER PUBLICATIONS

European Patent Office, European Search Report, Jun. 11, 2014, 7 pages.

* cited by examiner

Primary Examiner — Eric S McCall
(74) Attorney, Agent, or Firm — Kinney & Lange, P.A.

(57) ABSTRACT

A station probe employed in a gas turbine engine includes a rake portion having a plurality of sensors for sensing conditions in the gas turbine engine. An environmental container attached to the rake portion includes signal conditioning circuitry that locally analyzes sensor signals received from the plurality of sensors to generate measured values, and a communication module for communicating the measured values to a control room.

9 Claims, 2 Drawing Sheets

STATION PROBE FOR GAS TURBINE ENGINES

BACKGROUND

The present invention is related to station probes employed in gas turbine engines.

Station probes are employed in gas turbine engines to test the operation of the engine, including monitoring of the temperature and/or pressure of the working fluid (i.e., airflow) through the engine. To gather this data, station probes are positioned at various locations circumferentially and axially within the gas turbine engine.

A typical station probe consists of a tube (known as a rake portion) that extends radially into the engine with a plurality of temperature sensors (e.g., thermocouples) and inlets opened to monitor pressure located along the length of the tube. Each temperature sensor is connected by wire to a remotely located control room. Likewise, each pressure inlet is connected via pressure line (e.g., hose) to the remotely located control room. The control room includes signal conditioning circuitry for interpreting the inputs received form the temperature sensors and/or pressure inlets. Drawbacks of this architecture include long lengths of wire and/or pressure lines to connect the sensors back to the control room, which is expensive and introduces the possibility of faults along the way. Furthermore, each sensor and/or pressure inlet must be manually connected and disconnected each time the engine is moved from one test stand to another, which is a time-consuming and error-prone process.

SUMMARY

A station probe employed in a gas turbine engine includes a rake portion having a plurality of sensors for sensing conditions in the gas turbine engine. An environmental container attached to the rake portion includes signal conditioning circuitry that locally analyzes sensor signals received from the plurality of sensors to generate measured values, and a communication module for communicating the measured values to a control room.

DETAILED DESCRIPTION

Figure 1:
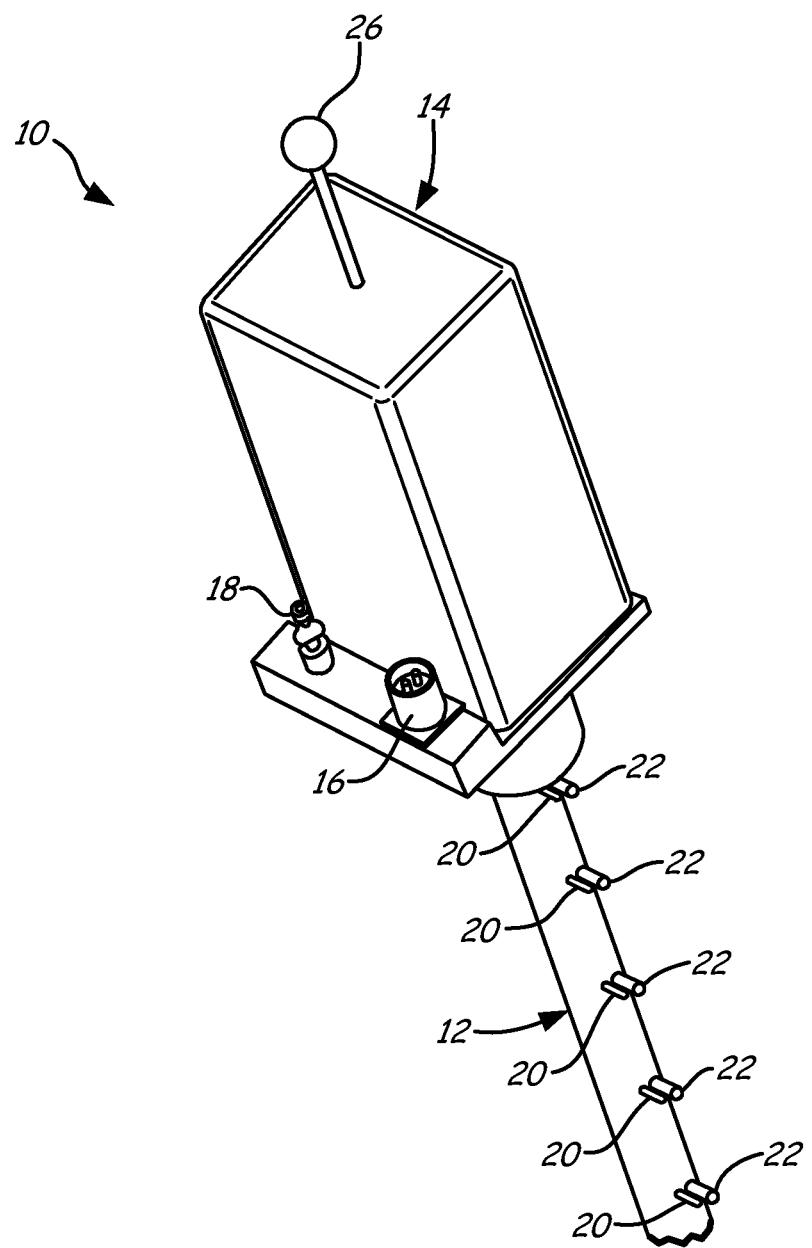
FIG. 1 is an orthogonal view of a station probe according to an embodiment of the present invention.

FIG. 1 is an orthogonal view of station probe 10 according to an embodiment of the present invention. Station probe 10 includes rake portion 12, environmental container 14, power input 16 and cooling fluid input 18. Rake portion 12 is tubular, with a plurality of sensor locations for mounting temperature sensors 20 and pressure sensor inlets 22. Environmental container 14 houses sensor conditioning circuitry (shown in FIG. 2) for interpreting sensor signals received from temperature sensors 20 and pressure sensor inlets 22 mounted along rake portion 12. For each temperature sensor 20, a wire or pair of wires runs within the tubular portion of rake portion 12 to connect the temperature sensor to the sensor conditioning circuitry. With respect to pressure sensor inlets 22, pressure lines run within the tubular portion of rake portion 12 to connect the pressure inlets to the sensor conditioning circuitry. With respect to the pressure signal provided by the pressure lines, a pressure transducer may be employed to convert the line pressure to an analog signal for provision to the sensor conditioning circuitry.

In one embodiment, station probe 10 would be mounted on an engine casing of a gas turbine engine, with rake portion 12 extending into the path of working fluid flowing through the gas turbine engine (i.e., the gas flow). Depending on the axial location of station probe 10 along the length of the gas turbine engine, temperatures may range from moderate (e.g., room temperature) to extreme (e.g., more than six hundred degrees Fahrenheit).

To maintain accurate measurements and prevent electronic component failure (i.e., accurate interpretation of signals provided by the sensors), the temperature within environmental container 14 should remain relatively constant despite the high temperatures to which station probe 10 is exposed. For example, in one embodiment temperature sensors 20 are thermocouples, with thermocouple wires connecting each sensor 20 to signal conditioning circuitry housed in environmental container 14. The thermocouple includes a hot junction (i.e., portion of the sensor exposed along rake portion 12) and a cold junction (located within environmental container 14), wherein a voltage generated by the thermocouple is based on the temperature difference between the hot junction and the cold junction. To correctly interpret the temperature at the hot junction, the temperature at the cold junction must be tightly regulated.

To regulate temperature within environmental container 14, a cooling fluid is provided via cooling fluid input 18 to environmental container 14. A controller (shown in FIG. 2) monitors temperature within environmental container 14 and selectively controls a position of a valve (also shown in FIG. 2) to regulate the flow of the cooling fluid and therefore the temperature within environmental container 14. In this way, the temperature within environmental container 14 is controlled to a desired value, providing, for example, a stable cold junction reference for use with thermocouple sensors. In addition, environmental container 14 may include other features, such as insulation, to mitigate drastic external temperature changes. Power input 16 provides power to circuitry included within environmental container 14, such as a controller, a valve, and sensor conditioning circuitry (shown in FIG. 2).

In the embodiment shown in FIG. 1, station probe 10 is a wireless station probe including wireless antenna 26 for transmitting sensor information from station probe 10 to a control room or data collection center. In other embodiments, a wired communication terminal is provided for communicating sensor information from station probe 10 to a control room or data collection center via a wired communication protocol.

A benefit of station probe 10 is signal conditioning circuitry is connected to various temperature sensors and/or pressure inlets only once, during assembly of station probe 10. Subsequently, station probe 10 may be installed on different engines without requiring each sensor to be individually disconnected/re-connected, only station probe 10 itself must be connected or disconnected from the engine being tested. In addition, station probe 10 does not require the presence of wires (i.e., thermocouple wires) and pressure lines extending from each sensor to a control room remotely located relative to station probe 10. Rather, the sensor signals provided by the plurality of temperature and/or pressure sensors are analyzed locally by the signal conditioning circuitry within environmental container 14 and measured temperature/pressure values are communicated wirelessly or via a single wired connection to a control room.

Figure 2:
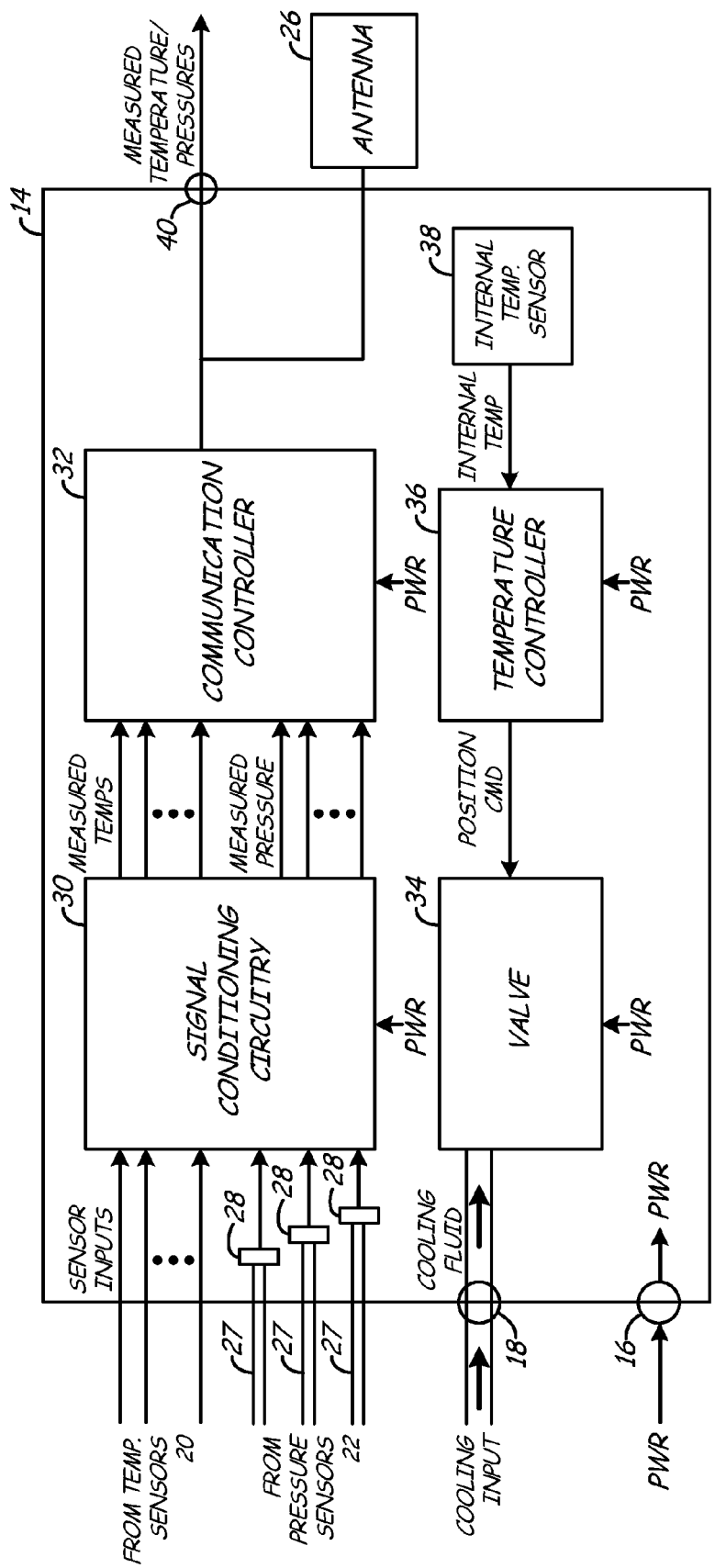
FIG. 2 is a block diagram of components included in an environmental container portion of the station probe according to an embodiment of the present invention.

FIG. 2 is a block diagram of components included in environmental container 14 according to an embodiment of the present invention. Components include signal conditioning circuitry 30, communication controller 32, cooling fluid valve 34, temperature controller 36, and internal temperature sensor 38. Inputs provided by temperature sensors 20 and from pressure sensor inlets 22 are provided to signal conditioning circuitry 30. In response to sensor signals received from the various temperature/pressure sensors, signal conditioning circuitry 30 generates measured sensor values (i.e., converts the voltage and/or current signals provided by the sensors to values representing the measured temperature and/or pressure).

Temperature sensors 20 may be thermocouple devices that provide a current and/or voltage signal having a magnitude related to the measured temperature, resistive temperature devices (RTDs) that require signal conditioning circuitry 30 to provide a reference voltage and/or current that is modified by the RTD based on the measured temperature, or other well-known types of temperature sensor. Signal conditioning circuitry 30 monitors the voltage and/or current signals provided by temperature sensors 20 and in response generates measured temperature values for provision to communication controller 32.

Likewise, signal conditioning circuitry 30 receives pressure inputs communicated via pressure lines from pressure sensor inlets 22 via pressure lines 27 and converted to analog signal by transducers 28. In the embodiment shown in FIG. 2, a pressure transducer is employed to convert the pressure signal to an analog signal for processing by signal conditioning circuitry 30, although in other embodiments other means may be employed to convert the pressure signal to an analog or electrical signal for processing by signal conditioning circuitry 30. The measured pressure values are provided to communication controller 32, which communicates the measured temperature and/or pressure signals either via wireless antenna 26 (also shown in FIG. 1) or wired connection via wired terminal 40 to a control room and or data collection center.

The internal temperature of environmental container 14 is regulated by controller 36 to maintain a desired temperature. Temperature controller 36 receives feedback from internal temperature sensor 38 regarding the temperature inside environmental container 14. Temperature sensor 38 may be an independent temperature sensor, or may monitor voltage at a cold junction terminal associated with one or more of the thermocouple wires associated with temperature sensors 20 to measure the internal temperature of environmental container 14. In response to the monitored internal temperature, temperature controller 36 modifies a position command to cooling fluid valve 34 to increase or decrease the flow of cooling fluid, and thereby regulate the temperature within environmental container 14.

In this way, the station probe employs an environmental container to provide a stable temperature environment for housing sensor circuitry used to locally interpret temperature and/or pressure signals provided by sensors located on an attached rake portion of the station probe. This solution obviates the need for long wires and/or pressure lines to connect sensors to a remotely located control room.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A station probe comprising:
a rake portion that includes a plurality of sensors;
an environmental container attached to one end of the rake portion, the environmental container including signal conditioning circuitry for analyzing sensor signals received from the plurality of sensors to generate measured sensor values, wherein the environmental container includes a cooling system for regulating an internal temperature of the environmental container; and
a communication module for communicating the measured sensor values to a control room, wherein the communication module is a wireless communication module that includes an antenna for wirelessly communicating the measured sensor values to the control room.

2. The station probe of claim 1, wherein the plurality of sensors include a plurality of temperature sensors, wherein the signal conditioning circuitry analyzes voltage and/or current signals provided by the plurality of temperature sensors to provide measured temperature values with respect to each of the plurality of sensors.

3. A station probe comprising:
a rake portion that includes a plurality of sensors;
an environmental container attached to one end of the rake portion, the environmental container including signal conditioning circuitry for analyzing sensor signals received from the plurality of sensors to generate measured sensor values, wherein the environmental container includes a cooling system for regulating an internal temperature of the environmental container, wherein the plurality of sensors include a plurality of pressure inlets, pressure lines, and pressure transducers, wherein the signal conditioning circuitry analyzes voltage and/or current signals provided by the plurality of pressure transducers to provide measured pressure values with respect to each of the plurality of pressure inlets; and
a communication module for communicating the measured sensor values to a control room.

4. A station probe comprising:
a rake portion that includes a plurality of sensors; and
an environmental container attached to one end of the rake portion, the environmental container comprising:
inputs connected to receive sensor signals from the plurality of sensors;
signal conditioning circuitry for interpreting inputs provided by the plurality of sensors to generate measured sensor values;
a cooling line input that receives a cooling fluid;
a valve that controls a flow of cooling fluid provided via the cooling line input;
a temperature sensor internal to the environmental container that provides temperature feedback regarding an internal temperature of the environmental container; and
a controller connected to control a position of the valve based on the monitored internal temperature of the environmental container to regulate the flow of cooling fluid provided via the cooling line input.

5. The station probe of claim 4, wherein the plurality of sensors located on the rake portion include temperature sensors connected to provide a voltage and/or current signal to the signal conditioning circuitry.

6. The station probe of claim 4, wherein the plurality of sensors located on the rake portion include pressure inlets connected by pressure lines to pressure transducers that convert pressure measured at each pressure inlet to an analog signal for provision to the signal conditioning circuitry.

7. The station probe of claim 4, further including:
  communication means for communicating measured sensor values to a control room.

8. The station probe of claim 7, wherein the communication means includes an antenna for wirelessly communicating measured sensor values to the control room.

9. The station probe of claim 7, wherein the communication means includes a terminal connected to communicate sensor values to the control room via a wired communication protocol.

* * * * *